Dec. 15, 1959 F. I. McCOSH 2,916,831
PLASTIC GRANULE DRYER AND CONVEYOR
Filed April 29, 1955 2 Sheets-Sheet 1
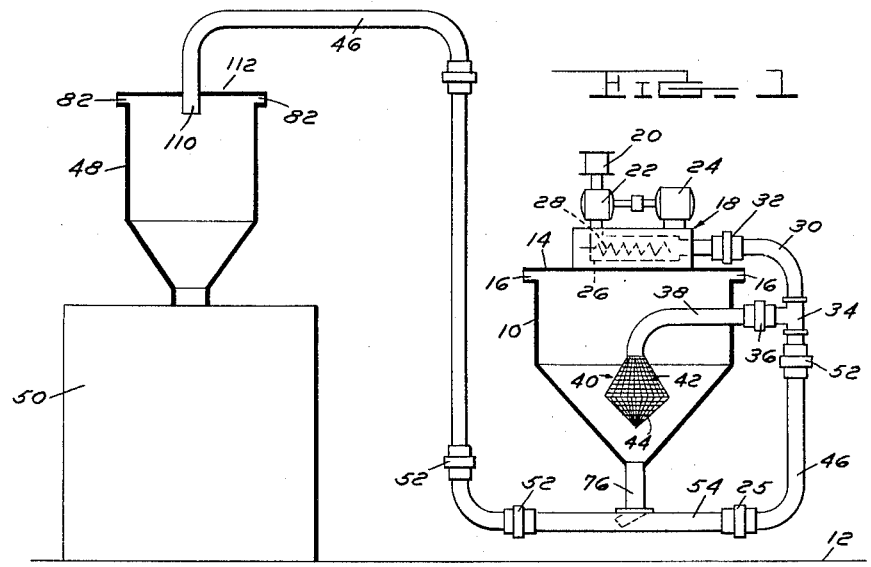
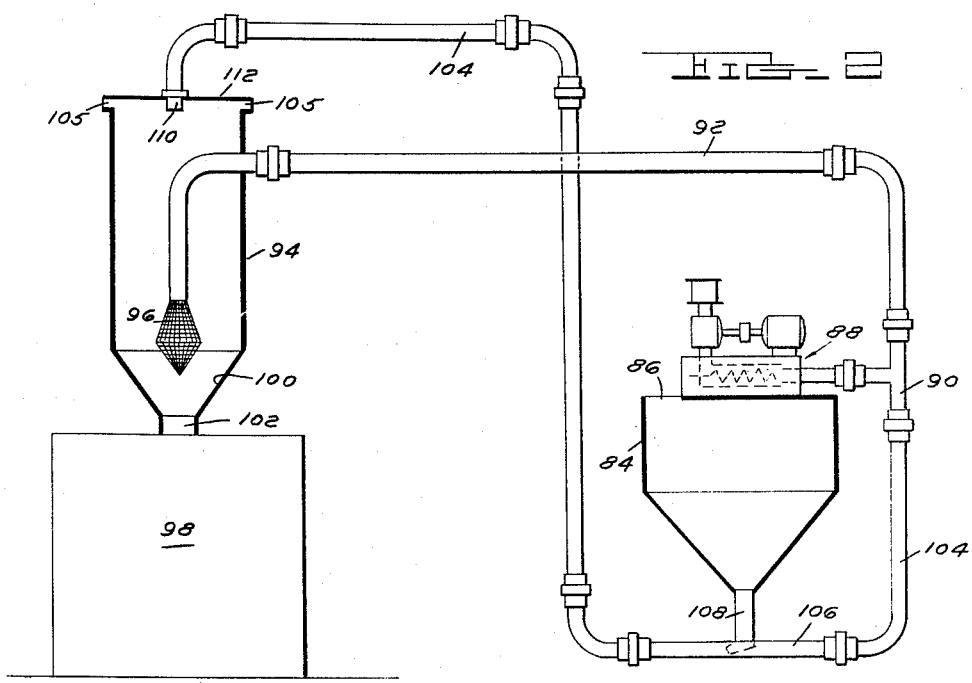
INVENTOR.
FREDERICK I. McCOSH
BY
Burton & Parker
ATTORNEYS

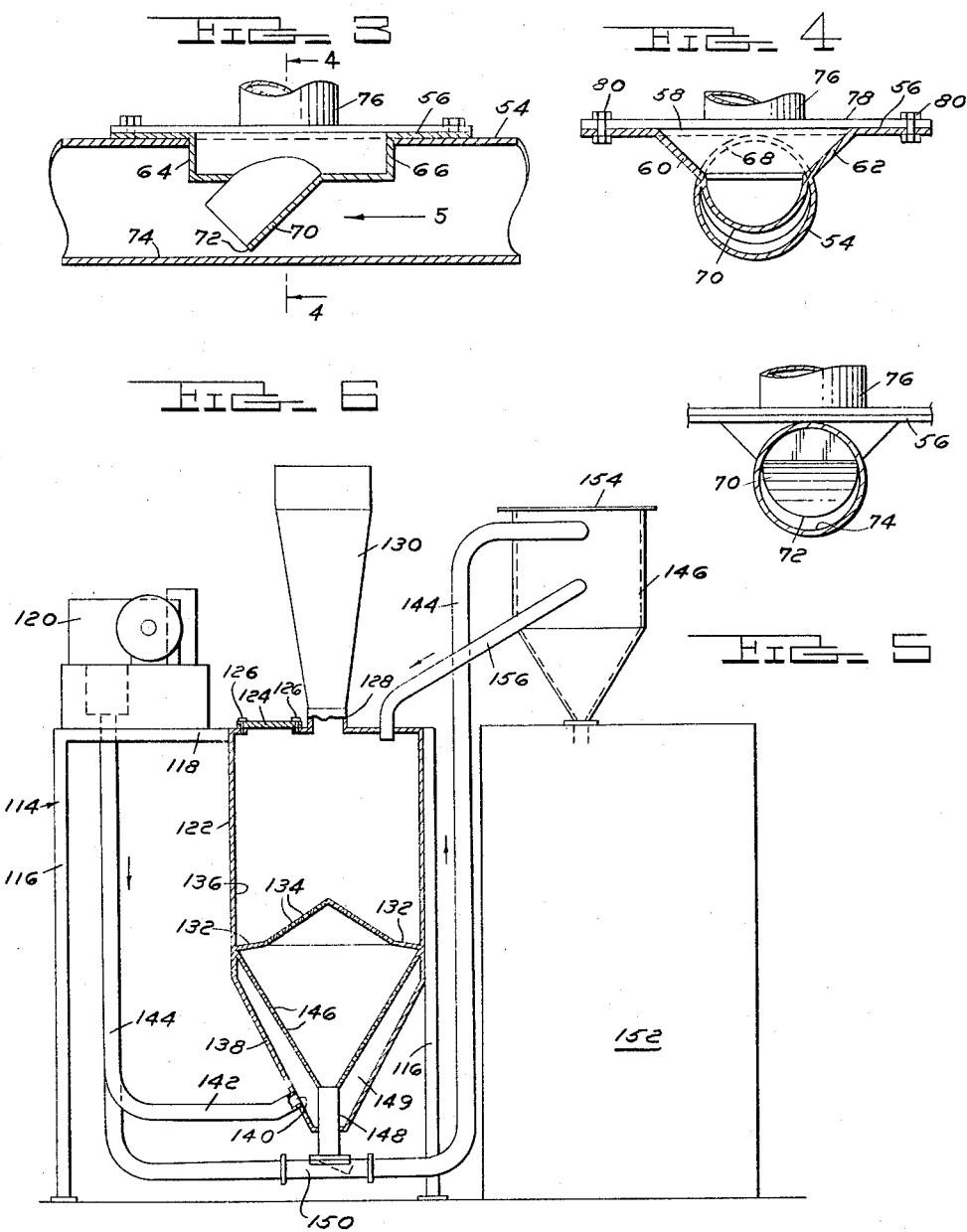

United States Patent Office
2,916,831
Patented Dec. 15, 1959

2,916,831

PLASTIC GRANULE DRYER AND CONVEYOR

Frederick I. McCosh, Detroit, Mich., assignor to Thoreson-McCosh, Inc., Detroit, Mich., a corporation of Michigan Application April 29, 1955, Serial No. 504,863

7 Claims. (Cl. 34—57)

This invention relates to a method of and apparatus for drying, pre-heating, and conveying granular or powdered plastic material, particularly that type of material that is used in the manufacture of plastic articles prior to molding or extruding the material into the articles.

Disclosed in the patent of Oran C. Wilson, Patent No. 2,641,848, assigned to the assignee of this application, is apparatus for drying and pre-heating particulate plastic material. As therein disclosed, a material receiving or feeding hopper is disposed atop a molding or extrusion machine, and the material is dried and pre-heated in this hopper, and is fed therefrom by gravity down into the processing machine. A disadvantage of the apparatus therein disclosed is the failure to dry and pre-heat the material as completely as is desired when the processing machine is in constant operation at full capacity. If the processing machine is operated intermittently so that the material remains in the hopper for a longer period of time before falling into the processing machine, then the material is more thoroughly and completely dried and pre-heated than if it moves constantly and rapidly into the processing machine.

Another disadvantage of the apparatus disclosed in the Wilson patent arises from the height of the top of the hopper above the floor. When the hopper is mounted upon the top of the processing machine, such as is disclosed in Wilson, the top of the hopper is some substantial distance above the floor. Its height above the floor is such as requires a workman to climb a ladder placed adjacent the machine in order to fill the hopper. The raw plastic material is sold in drums. In order to fill the hopper a workman must carry the drum to the top of the hopper and pour the material from the drum into the hopper while balancing himself and the drum at the top of the ladder. Not only is this inconvenient and inefficient, but there is the attendant danger of the workman falling from the ladder.

The method and apparatus disclosed in this application overcomes both of these disadvantages in a unique manner as hereinafter described.

One advantage of the present invention is the provision of a method whereby the plastic particulate material is conveyed from a bin, easily accessible to a workman and into which he may readily pour the material, to the hopper atop the processing machine, with the material being constantly pre-heated and dried from the time it is deposited in the bin until the time it enters the processing machine.

An object of the invention is the provision of apparatus for pre-heating and drying plastic particulate or comminuted material and conveying the material while so heating and drying it from one station to another station.

A concomitant object of the invention is the provision of a method of conveying, heating, and drying plastic granules or powder which includes the heating and drying of the material by hot air while the material is stored in one compartment and thereafter conveying the material by hot air from this compartment to a hopper atop a processing machine, and thereafter continuing to heat and dry the plastic material while it is in the hopper prior to being discharged into the processing machine.

Another object of the invention is the provision of apparatus for pre-heating, drying, and conveying plastic comminuted material which comprises a bin in which the material is initially placed, with an air blower and heater unit connected to the bin to force hot air through the material, with a conveying conduit extending from the blower and heater unit to a hopper, and improved means connecting the bin to the conduit whereby the material in the bin is entrained in the hot air passing through the conduit and delivered to the hopper, with the material in the hopper being heated by the hot air passing out of the conduit into the bin.

Another object of the invention is the provision in apparatus of the character described of a hot air conduit independent of the conveying conduit and which is adapted to deliver a stream of hot air to the hopper and discharge the hot air at the bottom of the hopper near the discharge port for the passage of material in the hopper to the processing machine.

Another object of the invention is the provision of apparatus particularly adapted for the pre-heating, drying, and conveying of powdered plastic material from a storage bin to a hopper atop a processing machine, and which apparatus includes a novel bin for storing the material, which bin is provided with a dust-proof closure at the top and improved material supporting and air diffusing baffles within the bin. Such apparatus also includes a material delivery conduit extending between the bin and the hopper, and a material re-circulation line for returning air and an excess of material from the hopper to the bin.

Still another object of the invention is the provision of an improved mixing device for entraining particulate plastic material in an air stream passing through a conduit where the plastic material falls by gravity into the air stream, and the air pressure in the conduit is under one pound per square inch.

Other objects, advantages, and meritorious features will more fully appear from the specification, claims, and accompanying drawing, wherein:

Fig. 1 is a schematic view of one embodiment of the invention;

Fig. 2 is a schematic view of another embodiment of the invention;

Fig. 3 is a detailed cross sectional view of an improved mixing chamber for the entrainment of particulate plastic material in a low pressure air stream;

Fig. 4 is a cross sectional view taken on the line 4—4 of Fig. 3;

Fig. 5 is an end view looking in the direction of arrow 5 in Fig. 3; and

Fig. 6 is a schematic view of still another embodiment of the invention.

The invention herein disclosed is adapted to elevate, dry, and pre-heat plastic granular and powdered material, with the material being elevated from a bin or container at floor level to a hopper or material intake opening atop a plastic processing machine, such as an injection molding machine, a compression molding machine, or an extrusion machine.

One form of the invention is shown in Fig. 1. In this embodiment a plastic material storage bin or compartment 10 is adapted to be supported on the floor 12 in any convenient manner. The bin 10 forms one station at which the material is disposed during a portion of the process hereinafter described. The top 14 of the bin is provided with a lid, not shown, which may be raised to permit plastic granules to be poured into the bin. Suitable means may be provided for holding the lid closed on top 14. These plastic granules are in the nature of 1/16" in diameter and are sold by suppliers in barrel-like containers or drums which may weigh any-where from 50 to 100 pounds or more. The bin is also provided with air escape ports 16 for a purpose becoming hereinafter apparent.

Mounted upon the top 14 of the bin is an air blower and heater unit 18 which includes an air intake filter 20 of conventional construction, a positive displacement air blower 22 of conventional construction and driven by an electric motor 24. The blower 22 discharges air into a heating chamber 26 within which chamber is an electric heating element 28 suitably thermostatically controlled in any convenient manner, such as by the arrangement shown in the hereinabove mentioned Wilson patent. The positive displacement blower 22 is adapted to maintain a low air pressure in the heating chamber and in the conduits or lines hereinafter described, said pressure being of the character of from ¼ to ¾ pounds per square inch.

Leading from the discharge side of the heating chamber 26 is a conduit section 30, suitably provided with a "union" coupling 32. Conduit 30 communicates with a T fitting 34, one leg of which is provided with a "union" 36. A conduit section 38 extends through a side wall of the bin and is provided at its discharge end with a double cone-like diffuser 40, having an upper half 42 and a lower half 44. Both halves of the diffuser are conically shaped and perforated, and are adapted to direct the air entering the diffuser in all directions throughout the interior of the bin. With the bin full of plastic granules, the hot air is diffused throughout the granules to dry and pre-heat them, with the air escaping out of the bin through exhaust ports 16.

Another leg of T 34 communicates with another conduit 46, which extends from the T downwardly and beneath the bin, and then upwardly to the hopper 48 atop the plastic processing machine 50. Suitable "unions" 52 in conduit 46 permit ready assembly or disassembly thereof. That portion 54 of conduit 46, which passes beneath the bin, forms an improved plastic mixing chamber shown more particularly in Figs. 3, 4, and 5, and which is adapted to entrain the plastic granules in the air stream passing through conduit 46. From the discharge end of section 54 to the hopper 48, the conduit 46 may be of a smaller diameter than conduit section 38, so that more hot air passes through section 38 than passes through conduit 46.

As shown in Figs. 3, 4, and 5, a plate 56 overlies the conduit portion 54. The plate is apertured as at 58. Downwardly inwardly extending wall portions 60 and 62 extend from the opposite sides of the aperture to the conduit section 54. Walls 64 and 66 at opposite ends of portions 60 and 62 form a closed chute which empties through an aperture 68 into the conduit section 54. Disposed directly below the chute and in plastics receiving communication therewith is an inclined scoop-like spout or spigot 70, the discharge end 72 of which is disposed closely adjacent the inside wall 74 of conduit section 54. Air enters the conduit and moves in the direction of arrow 5, and as it passes around the spout, it is traveling adjacent the walls of the conduit as a semi-circular curtain or layer of air.

Particulate plastic material enters the scoop-shaped spout or spigot through the bin discharge pipe 76, or if the mixing chamber is disposed directly against the lower floor of the bin, the material enters the chamber through an aperture in the bin floor. The pipe may be provided with a flange 78 which is secured to plate 56 by bolts or the like 80. The upper end of pipe 76 is disposed in plastic material feeding communication with the interior of the bin. The material flows into the discharge pipe 76 by gravity and follows the chute into the spigot from whence it falls into the semi-circular curtain or layer of air passing around the spout.

This spigot or spout acts as a venturi and creates a low pressure area at the discharge mouth of the scoop-shaped spigot, and as a result, the plastic material is drawn into the air stream, and the air in conduit section 56 does not tend to blow back up through the discharge pipe into the bin. With the air stream traveling in a curtain or layer next to the wall of the mixing chamber, the granules will not clog in the mixing chamber because the air stream passes between the granules and the encircling wall 74 of the chamber, or around the outside of the granules dropping into the chamber. Upon stopping the air flow through the chamber, the granules or particulate plastic material clogs the spigot or spout and prevents the granules from continuing to flow out of the bin. A mixing chamber of this design has been found very satisfactory, particularly when working with an extremely low air pressure as is the case here. Higher air pressures have been found undesirable because they tend to cause turbulence in the bin and hopper and result frequently in blowing the plastic material out through the exhaust ports 16 and 82. Each of the plastic granules or particles is very light weight and therefore the air diffusion must not be too rapid or the particles will scatter in all directions and not feed properly from the hopper down into the processing machine. From the mixing chamber the material is carried by the air stream up into the hopper 48 and is discharged into the hopper. During the travel of the material from the mixing chamber to the hopper it is suspended in the hot air passing through the conduit, and this tends to further dry and pre-heat the material. During the conveying of the material from the bin to the hopper it is thoroughly mixed with the hot air. For this reason the step of conveying the material by the hot air stream from the bin to the hopper is very effective in ensuring that the material is properly pre-heated and dried. When the material is discharged into the hopper the hot air in which it was suspended also flows into the hopper and continues to circulate over and through the material and tends to further dry and maintain the material in its pre-heated condition. As the material fills the hopper it builds up a pile of material below the exhaust end 110 of conduit 46, which pile increases in height and finally surrounds the end 110. With the material surrounding end 110 of the conduit, the hot air from the conduit 46 flows through the material and thereby further dries the material. This hot air is afforded escape from the hopper through the exhaust ports 82. The material in the hopper feeds by gravity into the plastic processing machine 50.

It is now apparent that the apparatus shown in Fig. 1 dries and pre-heats the plastic material from the time it is first deposited in bin 10 to the time it is fed into the processing machine 50, and that this drying and pre-heating is accomplished not only while the material is in the bin and hopper, but also while it is being conveyed therebetween. It is also apparent that the apparatus provides means for elevating the material from a readily accessible station to another station atop a plastics processing machine, and that during such conveying the material is not allowed to cool or absorb moisture, but on the contrary is further pre-heated and dried.

A modified form of the apparatus is shown in Fig. 2. In this embodiment the air blower and heater unit 88 is the same as unit 18 above described. The Fig. 2 modification differs from Fig. 1 in that the bin 84 is open at the top as at 86, and there is no conduit section which extends into the bin as it does at 38 in Fig. 1. Instead a T coupling 90 is connected to the air discharge line of the air heater chamber, and one leg of the T is connected to a conduit 92 which extends through the side wall of hopper 94 to terminate in a diffuser 96. The hopper is mounted atop a plastics processing machine 98 similar to hopper 48 in Fig. 1. However, the hopper 94 is of a substantially greater vertical dimension than 48. The diffuser 96 is of the same construction as diffuser 40 but is slightly differently shaped to conform to the shape of the sloping floor 100 of the hopper. The diffuser 96 is disposed just above the hopper discharge conduit 102, and all plastics material passing down the sloping floor 100 must pass through the air stream radiating from the diffuser.

Another conduit 104 extends from T 90 downwardly and under the bin and thence upwardly to discharge into the top of hopper 94. Exhaust ports 105 in the hopper permit the escape of hot air from the hopper. Conduit 104 has a mixing chamber 106 below the bin, and into which plastics material in the bin feeds through discharge pipe 108, to be entrained in the hot air stream passing through conduit 104.

In this embodiment the material is not dried or preheated in the bin but only in conduit 104 between the mixing chamber and the hopper, and in the hopper itself. During the conveying of the material from the bin to the hopper it is initially pre-heated and dried, and after it is deposited in the hopper this pre-heating and drying continues. The Fig. 2 modification is intended primarily for plastics processors already having installed the pre-heater and dryer disclosed in the Wilson patent.

In both the Figs. 1 and 2 embodiments, the flow of plastics material to the hopper is automatically interrupted when the hopper is full. This is accomplished by the material building up in the hopper and blocking the discharge end 110 of the conduits 46 and 104, which end, it will be noted, projects downwardly below the top 112 of the hoppers 48 and 94. When this discharge end 110 is blocked, the flow of air through conduits 46 and 104 between the mixing chambers and the hoppers is impeded, and the air in these conduits backs up through the mixing chambers and the discharge pipes 76 and 108 and exhausts into the bins. The flow of plastics material through the conduits 46 and 104 between the mixing chambers and the hoppers is in this way stopped or controlled until the level of material in the hoppers is reduced.

In Fig. 6 another form of the invention is shown which is particularly adapted for use with powdered plastics material that is more fine than the material used in the Figs. 1 and 2 embodiments, and which approaches the character of fine salt. Each particle of this powdered plastic material is very light weight and highly susceptible of dispersion in air drafts. Its powdered character requires a somewhat different type of apparatus and method of handling than the apparatus shown in Figs. 1 and 2. While the apparatus of Figs. 1 and 2 will operate to preheat, dry, and convey the powdered plastics material, the material tends to escape from the exhaust ports 16, 82, and 105, and out of the opening 86 in the Fig. 2 bin. In addition, there is a tendency for the powdered plastic material to pack itself in the bin and hopper, and once this has started, the material does not flow readily.

A frame 114 is provided having legs 116 and a flat top portion 118 upon which rests an air blower and heater unit 120, which may be of the same type as unit 18, or any other conventional heater and blower unit. A large covered bin 122 is disposed within the frame and is provided with a removable or hinged lid 124, which may be held sealed over a bin-filling aperture by fasteners 126 of any convenient construction. Over the upper end of an exhaust pipe 128 is received the neck of a filter bag 130, which may be of an air-pervious material of a sufficiently fine weave as will prevent powdered plastic material from blowing therethrough.

Within the bin, mounted upon suitable struts 132, is a perforated cone-shaped baffle 134, spaced equidistantly from the wall 136 of the bin. The lower end of the bin slopes steeply downwardly as at 138, and is provided with an air intake port 140 into which there is connected an air conduit 142, which is a branch line of a primary conduit 144 extending from the blower and heater unit 120 to the hopper 153. Below the baffle 134 is a cone-shaped perforated wall 146, which at its upper edge meets the wall 136 of the bin, and which at its lower end or apex, empties into a plastic material discharge line 148.

The line 148 at its lower end is connected with a mixing chamber 150 disposed in the conduit 144. The mixing chamber is of a construction similar to that shown in Figs. 3–5 and therefore needs no further description.

The perforated cone-shaped member 146 forms with the sloping wall 138 a cone-shaped air circulation chamber which is fed air from the branch conduit 142. The air in this circulation chamber passes upwardly through the perforated floor 146 and rises through the plastic material in the bin to escape to the atmosphere through filter bag 130. The perforated floor 146 is adapted to support the weight of the plastic material below baffle 134 and direct the flow of the material into pipe 148. The baffle 134 is adapted to support a substantial portion of the weight of the powdered plastic material in the bin, with the material flowing by gravity around the edge of the baffle as the material is exhausted from the bin through pipe 148. The upward flow of the air through the perforations in conical floor 146 prevents the material from packing together upon floor 146 and forms an air layer over the upper surface of floor 146 that tends to increase the ease with which the plastic material flows down to line 148. In addition the air flowing upwardly through floor 146 pre-heats and dries the plastic material in the bin. The plastics processing machine is indicated at 152. The hopper 153 is mounted atop the machine. The hopper is sealingly closed at the top by a lid 154. The conduit 144 enters the hopper through the side wall thereof adjacent the lid, and the plastics material enters the hopper from this conduit as hereinbefore mentioned. Another conduit 156 extends at one end into the hopper spaced below conduit 144, and extends at the other end into the bin 122. Conduit 156 serves as a re-circulation line to permit the re-circulation of hot air and plastic material from the hopper to the bin. In addition conduit 156 serves to maintain the level of the powdered plastic material in the hopper at substantially the point where conduit 156 enters the hopper. There is no outlet for the hot air entering the hopper except out through conduit 156 and therefore the air passes out of the hopper through this conduit and back into the bin. From the bin the air is discharged into the atmosphere through the filter bag 130. In this way the powdered plastic material is constantly being returned to the bin through conduit 156, and constantly enters the hopper through the conduit 144. The conduit 156 may be of a slightly larger inside diameter than conduit 144 to reduce the velocity of the powdered material as it returns to the bin 122. The air pressure that has been found most desirable in this embodiment of the invention is substantially the same as that heretofore mentioned, viz: ¼ to ¾ pound per square inch.

It will be noted that with this embodiment of the invention the plastic material is dried and pre-heated in the bin, is then conveyed by hot air to the hopper and pre-heated and dried during this conveying step, and then a portion of the material is returned to the bin from the hopper while being further dried and pre-heated. The amount of material that is returned to the bin is equivalent to the difference between the amount delivered to the hopper by conduit 144 and the amount that is used by the processing machine.

What I claim is:

1. Apparatus for handling particulate plastic material preparatory to deposit in a processing machine comprising: a plastic material storage compartment disposed at floor level, a plastic material feeding compartment disposed atop the processing machine, an air heater and blower unit, a first air conduit communicating at one end with the discharge side of said unit and at the other end with the feeding compartment, a mixing chamber disposed in the conduit and communicating with the storage compartment and adapted to entrain particulate plastic material in the compartment in an air stream flowing through the conduit, and a second air conduit communicating at one end with the discharge side of said unit and at the other end with one of the compartments and adapted to exhaust into an aggregate of plastic material in the compartment.

2. Apparatus for handling particulate plastic material preparatory to deposit in a processing machine comprising: a plastic material storage compartment disposed at floor level, a plastic material feeding compartment disposed atop the processing machine, an air heater and blower unit, a first air conduit communicating at one end with the discharge side of said unit and at the other end with the feeding compartment, a mixing chamber disposed in the conduit and communicating with the storage compartment and adapted to entrain particulate plastic material in the compartment in an air stream flowing through the conduit, and a second air conduit communicating at one end with the discharge side of said unit and at the other end with the interior of the storage compartment and adapted to exhaust into an aggregate of plastic material in the storage compartment to heat and dry the same.

3. Apparatus for handling particulate plastic material preparatory to deposit in a processing machine comprising: a plastic material storage compartment disposed at floor level, a plastic material feeding compartment disposed atop the processing machine, an air heater and blower unit, a first air conduit communicating at one end with the discharge side of said unit and at the other end with the feeding compartment, a mixing chamber disposed in the conduit and communicating with the storage compartment and adapted to entrain particulate plastic material in the compartment in an air stream flowing through the conduit, and a second air conduit communicating at one end with the discharge side of said unit and at the other end with the interior of the feeding compartment and adapted to exhaust into an aggregate of plastic material in the feeding compartment to heat and dry the same.

4. Apparatus for handling particulate plastic material preparatory to deposit in a processing machine having a material intake port comprising: a particulate plastic material storage compartment disposed remote from the intake port of the processing machine, a particulate plastic feeding compartment disposed in feeding communication with the intake port of the machine, heater and blower means for generating a stream of heated air, a first air conduit communicating at one end with the discharge side of said means and at the other end with the feeding compartment, particle entraining means communicating with the conduit and with the storage compartment and adapted to entrain particulate plastic material from the compartment in an air stream flowing through the conduit, a second air conduit communicating at one end with the discharge side of said means and at the other end with the storage compartment, and a third conduit communicating at one end with the storage compartment and at the other end with the feeding compartment, said third conduit providing an air and plastic material recirculation line between the two compartments, and an air filter on the air storage compartment adapted to filter air escaping therethrough to the atmosphere.

5. Apparatus for handling particulate plastic material preparatory to deposit in a processing machine having a material intake port comprising: a material storage bin disposed at floor level, an elevated airtight feeding hopper disposed in material feeding communication with the intake port of the processing machine, heater and blower means for generating a stream of heated air, a first air conduit communicating at one end with the discharge side of said means and at the other end with the top of the hopper, plastic material entraining means communicating with the bin and the conduit and adapted to entrain particulate plastic material from the hopper in an air stream flowing through the conduit, a second conduit communicating at one end with the discharge side of said heater and blower means and at the other end with the bottom of said bin, an air escape port atop of said bin, filter means associated with the air escape port to filter plastic material from the air leaving the bin, and a third conduit communicating at one end with the bin adjacent the top thereof and at the other end with the hopper spaced below the first conduit and adapted to re-circulate the air and particulate material from the hopper to the bin for escape of the air to the atmosphere and the deposit of the material in the bin.

6. Apparatus for handling particulate plastic material preparatory to deposit in a processing machine having a material intake port comprising: a particulate plastic material storage compartment disposed remote from the intake port of the processing machine, a particulate plastic feeding compartment disposed in feeding communication with the intake port of the machine, heater and blower means for generating a stream of heated air, a first air conduit communicating at one end with the discharge side of said means and at the other end with the feeding compartment, a mixing chamber disposed at the bottom of the storage compartment in material feeding communication therewith and adapted to entrain plastic material from the compartment in an air stream flowing through the conduit, said chamber including a conduit section and a scoop-shaped spigot extending angularly downwardly through the top of the wall of the conduit with the peripheral edge of the spigot disposed closely adjacent the wall of the conduit, a second air conduit communicating at one end with the discharge side of said heater and blower means and at the other end with one of the compartments to discharge thereinto and into the plastic material in the compartment.

7. Apparatus for handling particulate plastic material preparatory to deposit in a processing machine having a material intake port comprising: a particulate material storage bin, a cone-shaped perforated material supporting floor in the bin spaced from the encircling bottom wall of the bin and forming therebetween an air circulating chamber with the apex of the cone adjacent the bin floor, air heater and blower means, a plastic material feed hopper disposed in feeding communication with the intake port of the processing machine, a conduit communicating at one end with the discharge side of said means and at the other end with the feed hopper, a materials mixing chamber in the conduit beneath the bin and in material feeding communication with the conical floor at the apex thereof, and a second conduit communicating at one end with the discharge side of said means and communicating at the other end with the air circulating chamber below the perforated material supporting floor, and said bin having an air discharge port at the top, whereby the material in the bin flows into the mixing chamber through the apex of the perforated floor while hot air passes upwardly through the floor and through the material about to enter the mixing chamber.

References Cited in the file of this patent

UNITED STATES PATENTS

| | | |
|---|---|---|
| 1,243,892 | Strong | Oct. 23, 1917 |
| 1,619,577 | Jensen | Mar. 1, 1927 |
| 1,729,424 | Harshaw et al. | Sept. 24, 1929 |
| 1,892,233 | Chappell | Dec. 27, 1932 |
| 1,988,541 | Christensen | Jan. 22, 1935 |
| 2,069,873 | Chenault | Feb. 9, 1937 |
| 2,082,555 | Smith | June 1, 1937 |
| 2,115,645 | Pehrson et al. | Apr. 26, 1938 |
| 2,502,953 | Jahnig | Apr. 4, 1950 |
| 2,535,829 | Beck | Dec. 26, 1950 |
| 2,548,332 | Alexander et al. | Apr. 10, 1951 |
| 2,609,248 | Kleiber | Sept. 2, 1952 |
| 2,613,450 | Nichols et al. | Oct. 14, 1952 |
| 2,641,848 | Wilson | June 16, 1953 |
| 2,726,137 | Davis | Dec. 6, 1955 |